United States Patent Office 3,454,427
Patented July 8, 1969

3,454,427
METHOD OF DISINTEGRATING SLIMES
Shizuo Suzuki, Tokyo, and Koso Takeuchi, Yokohama-shi, Japan, assignors to Kurita Industrial Co., Ltd., Osaka-shi, Japan, a corporation of Japan
No Drawing. Filed May 13, 1966, Ser. No. 549,794
Claims priority, application Japan, May 17, 1965, 40/29,160
Int. Cl. B08b 9/02
U.S. Cl. 134—22    4 Claims

ABSTRACT OF THE DISCLOSURE

A method is disclosed for removing slimes from the surfaces of industrial plant equipment such as cooling pipes, waste water treating apparatus or water draining pipes wherein slimes have developed owing to the breeding of molds or filamentous bacteria. The method involves destroying and peeling off said slimes by introducing into said equipment, for contact with the adhering slimes, a solution containing both sodium hypochlorite and hydrogen peroxide, while stirring said solution in said equipment.

---

The present invention relates to a method of disintegrating or destroying slimes which have developed in the equipments in various industrial plants, by the use of a material such as sodium hypochlorite or hydrogen peroxide.

Micro-organisms or fungi would grow in the pipes of the cooling line, apparatuses for treating the waste liquids or in the drain pipes in the industrial plants and form slimes in such equipments, resulting in the occurrence of hazards such as blocking of pipes and contamination of the water to be used. Conventional measures of preventing the development of slimes have relied on the use of microbicides or fungicides such, for example, as organic mercurial preparations, organic tin preparations or arsenic preparations. Once a slime has developed, however, the microorganisms or fungi constituting a slime may be annihilated by pouring these germicides onto the formed slime. Nevertheless, the slime itself would retain its configuration as a mass, and sticks to the peripheries of the equipment, without the mass being disintegrated or destroyed. As such, the slime after undergoing a microorganism extirpation treatment would develop peeling off of the mass in small quantities, resulting in the contamination of the water for use in plants.

It is, therefore, the object of the present invention to provide a method of peeling off and destroying the formed slime altogether at once without leaving any residual undestroyed mass of slime sticking to the peripheries of the equipment.

According to the method of the present invention, there is provided a method of destroying slimes, characterized by the steps of: subjecting the slimes to a solution of sodium hypochlorite and subsequently adding a solution of hydrogen peroxide thereto, or having the slime contacted by a mixed solution of sodium hypochlorite and hydrogen peroxide.

The content of sodium hypochlorite in the solution which is brought into contact with the slime is in the range from 0.1 to 2% of the volume of the solution, and this solution is subsequently added with hydrogen peroxide of an amount ranging from 0.05 to 0.1%. The mixed solution is kept under a turbulent state, that is, the solution is circulated or stirred in the system in which it is introduced, and such stirring is continued for a length of time ranging from 10 to 20 minutes, which results in a complete destruction of the mass of the slime. It is to be understood, however, that the concentration of the solution used in such treatment should vary depending upon the type, the configuration and the size of the slime. In general, however, slimes consisting of zooglea and other bacteria readily become disintegrated.

Even when a slime contains a small amount of mycelia of mold, such slime will readily become disintegrated into pulverized state by the use of the method of the present invention. Slimes consisting of fungi or iron bacteria represent firm masses, but they can be completely destroyed by the use of a treating agent of high concentration or by a prolonged treating or contact time. Practically all types of slimes can be disintegrated into fine pulverized state by the use of a solution of sodium hypochlorite. Contact of slimes with such solution is preferably accompanied by circulation or stirring of the solution for the sake of developing turbulence while in the case of treatment in a static manner, such treatment should continue for one to two hours. Destruction of slimes will be further facilitated by subjecting the slimes to a germicide such as an organic mercurial preparation, a tin preparation or an arsenic preparation, prior to being contacted by a solution of sodium hypochlorite. Such preliminary germ-killing process may employ a conventional method. For example, sterilization is accomplished by the use of several p.p.m. of mercurial preparation or several tens of p.p.m. of tin preparation. The slimes which have undergone a germ-killing treatment with such preparations retain their original mass configurations without becoming disintegrated or peeled off yet. These slimes can be completely destroyed and removed by the use of the aforesaid treatment using a solution of sodium hypochlorite.

The fear for development of corrosion in the steel materials of the equipments after being contacted by the treating solution is negligible because of the extremely limited duration of contact. In an experiment conducted by the inventors, the weight loss due to corrosion of the test piece comprising about 10 grams of soft steel material having a surface area of 31.6 cm.$^2$, after being immersed in the solution of 1% sodium hypochlorite for 8 minutes, was 3 mg. Corrosion of this degree is equivalent to the amount of corrosion of the same material occurring when immersed in an ordinary coolant for 24 hours, and thus the degree of the former corrosion should be almost negligible when compared with the damage due to the formation of slime. It is needless to say that the amount of corrosion from an 8-minute immersion can be reduced to the order of 0.1 mg. by the use of an anticorrosive agent.

chlorite and also the result obtained from immersing in solutions containing only hydrogen peroxide.

TABLE 1

|  | Concentration of sodium hypochlorite, percent | Concentration of hydrogen peroxide, percent | Peeling-off of slime |
|---|---|---|---|
| Using the present method | 0.1 | 0.1 | About 60% peeled off. |
|  | 0.5 | 0.1 | About 90% peeled off. |
|  | 1.0 | 0.1 | Do. |
| For comparison | 0.1 | 0 | Practically no peeling occurred. |
|  | 0.5 | 0 | About 5% peeled off. |
|  | 1.0 | 0 | About 10% peeled off. |
|  | 0 | 0.1 | Do. |

Description will now be made on some of the preferred embodiments of the present invention to demonstrate the effect obtained from the use of the method of the present invention. It is to be understood that these embodiments are given solely by way of example.

Example 1

Pieces of cloth of about 10 cm. x 10 cm. were hung for about one month in a cooling line in which slimes have developed, to thereby cause slimes to grow on the entire surface of the cloth. The slime-formed pieces of cloth were then immersed in solutions comprising 100 p.p.m. of alkyldimethyl benzyl ammonium chloride for 30 minutes to kill germs, followed by a slime-destroying test. The slimes consisted principally of zooglea and penecillium. The destruction test was conducted by hanging said pieces of cloth in the solutions of sodium hypochlorite with concentrations enumerated in the following Table 1 for 5 minutes, and then adding hydrogen peroxide thereto, and leaving the pieces of cloth immersed in the resulting mixed solution for 20 minutes. During this period, the mixed solution was slowly stirred once every 1 minute. The peeled-off state of the slime after the test is as shown in Table 1. For the convenience of comparison, Table 1 contains the result obtained from immersing the test pieces in solutions containing only sodium hypochlorite and also the result obtained from immersing in solutions containing only hydrogen peroxide.

Example 2

Pieces of cloth were hung in the slime-developed oil separator in a petrochemical plant to develop slimes in just the same manner as has been described in connection with Example 1, and after having sterilized the test pieces also in the same fashion, a slime disintegration test was conducted. The slimes consisted principally of pseudomonas, spherotius and also fungi of unidentified species. The slime disintegration test was conducted under the same conditions as were used in Example 1, and the result is as shown in the following Table 2.

TABLE 2

|  | Concentration of sodium hypochlorite, percent | Concentration of hydrogen peroxide, percent | Peeling-off of slime |
|---|---|---|---|
| Using the present method | 1 | 0.05 | About 90% peeled off. |
|  | 2 | 0.05 | Do. |
| For comparison | 1 | 0 | About 5% peeled off. |
|  | 2 | 0 | About 10% peeled off. |
|  | 0 | 0.05 | Do. |

Example 3

Pieces of wood board of 10 cm. x 10 cm. were hung for about one month in a slime-developed oil separator of another petrochemical plant to cause slimes to develop on the entire surfaces of the wood pieces. The formed slimes consisted principally of zooglea and spherotius. A slime destruction test was conducted on these wood pieces. The result obtained is as shown in the following Table 3.

TABLE 3

|  | Concentration of sodium hypochlorite, percent | Concentration of hydrogen peroxide, percent | Peeling-off of slime |
|---|---|---|---|
| Using the present method | 0.5 | 0.05 | About 90% peeled off. |
|  | 1.0 | 0.05 | Do. |
|  | 2.0 | 0.05 | Do. |
| For comparison | 0.5 | 0 | About 5% peeled off. |
|  | 1.0 | 0 | About 10% peeled off. |
|  | 2.0 | 0 | About 20% peeled off. |
|  | 0 | 0.05 | About 10% peeled off. |

In the foregoing experiments, tests were also conducted by subjecting unsterilized slimes to solutions of sodium hypochlorite, using the same procedures as have been described. The content of the sodium hypochlorite necessary for the accomplishment of complete destruction of the masses of slimes was about 5 times as much as that necessary for the sterilized slimes.

It will now be clearly undertood that the desired destruction of slimes which has been difficult in the past can now be attained by the use of the method of the present invention.

What we claim is:

1. A method for removing slimes from the surfaces of industrial plant equipment by destroying and peeling off the firmly adhering slimes, said method comprising introducing into said equipment, for contact with said slimes, a solution containing sodium hypochlorite in a concentration ranging from 0.1 to 2.0% and also containing hydrogen peroxide in a concentration ranging from 0.05 to 0.1%, while stirring said solution in said equipment.

2. A method according to claim 1, wherein the introduction of said solution into contact with the slimes is effected after said slimes have been disinfected by contacting with a germicide which is introduced into said equipment before said solution is introduced.

3. A method for removing slimes from the surfaces of industrial plant equipment by destroying and peeling off the firmly adhering slimes, said method comprising first introducing into said equipment, for contact with said slimes, a solution containing sodium hypochlorite having a concentration ranging from 0.1 to 2.0% while stirring said solution, and subsequently introducing into said equipment for contact with said slimes a solution containing hydrogen peroxide in a concentration ranging from 0.05 to 0.1% while stirring said solution.

4. A method according to claim 3 wherein a germicide is introduced into said equipment for contact with said slimes prior to the introduction of the respective solutions.

References Cited

UNITED STATES PATENTS

| | | | |
|---|---|---|---|
| 1,078,918 | 11/1913 | Gruter | 210—62 |
| 2,189,378 | 2/1940 | Kauffman | 252—94 |
| 2,944,967 | 7/1960 | Dunklin et al. | 210—64 |

FOREIGN PATENTS

| | | |
|---|---|---|
| 21,911 | 1900 | Great Britain. |

OTHER REFERENCES

Rose, The Cond. Chem. Dictionary (6th ed.), 1961, The Reinhold Pub. Co., p. 589.

LEON D. ROSDOL, *Primary Examiner.*

W. SCHULZ, *Assistant Examiner.*

U.S. Cl. X.R.

134—3, 26; 210—50, 62, 64; 252—87, 95